(12) United States Patent
Ding et al.

(10) Patent No.: US 11,343,574 B2
(45) Date of Patent: May 24, 2022

(54) METHOD, APPARATUS, ELECTRONIC DEVICE, AND STORAGE MEDIUM FOR RECOMMENDING MULTIMEDIA RESOURCE

(71) Applicant: BEIJING DAJIA INTERNET INFORMATION TECHNOLOGY CO., LTD., Beijing (CN)

(72) Inventors: Wenkui Ding, Beijing (CN); Yan Li, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 213 days.

(21) Appl. No.: 16/884,678

(22) Filed: May 27, 2020

(65) Prior Publication Data

US 2020/0288205 A1    Sep. 10, 2020

(30) Foreign Application Priority Data

May 27, 2019 (CN) .......................... 201910446528.4

(51) Int. Cl.
| | |
|---|---|
| *H04N 21/466* | (2011.01) |
| *H04N 21/442* | (2011.01) |
| *G06K 9/62* | (2022.01) |
| *G06N 20/10* | (2019.01) |
| *G06N 3/08* | (2006.01) |

(52) U.S. Cl.
CPC ......... *H04N 21/4668* (2013.01); *G06K 9/623* (2013.01); *G06K 9/6289* (2013.01); *G06N 3/084* (2013.01); *G06N 20/10* (2019.01); *H04N 21/44218* (2013.01)

(58) Field of Classification Search
CPC ........ G06N 20/10; G06N 3/084; G06K 9/623; G06K 9/6289; H04N 21/4668; H04N 21/44218
See application file for complete search history.

(56) References Cited

U.S. PATENT DOCUMENTS

| | | | | |
|---|---|---|---|---|
| 2016/0299994 | A1* | 10/2016 | Hiller ...................... | G06F 30/20 |
| 2017/0185894 | A1* | 6/2017 | Volkovs ............... | G06N 3/0454 |
| 2021/0192220 | A1* | 6/2021 | Qu .......................... | G06V 10/82 |

* cited by examiner

*Primary Examiner* — Sumaiya A Chowdhury
(74) *Attorney, Agent, or Firm* — Meunier Carlin & Curfman LLC

(57) ABSTRACT

The present disclosure provides a method, an apparatus, an electronic device, and a storage medium for recommending multimedia resource, and relates to the field of machine learning. The method includes: acquiring features of the multimedia resource based on a convolutional neural network, where the convolutional neural network comprises N convolutional layers, where N is a positive integer; determining user interest information based on an identifier of a recommended user, where the user interest information is corresponding to the feature of each convolutional layer; determining a first feature matrix based on the convolution of convolution kernel and the feature, where the convolution kernel comprises the user interest information; generating user preference data based on the first feature matrix; and recommending the multimedia resource to the recommended user based on the N generated user preference data.

17 Claims, 8 Drawing Sheets

METHOD, APPARATUS, ELECTRONIC DEVICE, AND STORAGE MEDIUM FOR RECOMMENDING MULTIMEDIA RESOURCE

CROSS REFERENCE TO RELATED APPLICATIONS

This application claims priority to Chinese Patent Application No. 201910446528.4, filed on May 27, 2019, which is hereby incorporated by reference in its entirety.

FIELD

The present disclosure relates to the field of machine learning, and particularly to a method, an apparatus, an electronic device, and a storage medium for recommending multimedia resource.

BACKGROUND

With the rapid development of Internet technologies, a recommending system, as one of important means to solve a problem of information overload in the era of information explosion, has received widespread attention. For example, the recommending system at present has been successfully used in many fields such as e-commerce, video websites, and advertising recommendation. The recommending system recommends multimedia resources, such as pictures or videos, etc., to a user.

SUMMARY

The present disclosure provides a method, an apparatus, an electronic device, and a storage medium for recommending multimedia resource, which can improve recommending accuracy of multimedia resources.

In a first aspect, embodiments of the present disclosure provide a method for recommending multimedia resource. The method includes: acquiring features of the multimedia resource based on a convolutional neural network, where the convolutional neural network includes N convolutional layers and N is a positive integer; determining user interest information based on an identifier of a recommended user, where the user interest information is corresponding to the feature of each convolutional layer; determining a first feature matrix based on the convolution of convolution kernel and the feature, where the convolution kernel includes the user interest information; generating user preference data based on the first feature matrix; and recommending the multimedia resource to the recommended user based on the N generated user preference data.

In some embodiments, the method further includes: determining user attention information based on the identifier, where the user attention information matches with the features; generating a user attention weight based on the user attention information and the feature; and generating the user preference data based on the first feature matrix and the user attention weight.

In some embodiments, said generating the user attention weight includes: determining a second feature matrix based on the convolution of the convolution kernel and the feature, where the convolution kernel includes the user attention information; obtaining the user attention weight by normalizing the second feature matrix.

In some embodiments, said generating the user preference data includes: reducing a dimension of the first feature matrix by a maximum pooling layer; and determining the user preference data by weighting and fusing the dimension-reduced first feature matrix and the user attention weight.

In some embodiments, said recommending the multimedia resources to the recommended user includes: acquiring a target weight matrix, where the target weight matrix provides weights corresponding to the N generated user preference data; weighting and fusing the N generated user preference data based on the target weight matrix; and recommending the multimedia resource to the recommended user based on the weighted and fused user preference data.

In some embodiments, said determining the user interest information includes: determining the user interest information by vectorizing the identifier based on a first embedding layer, where the user interest information is a matrix with an m*m size, and m indicates a width of the convolution kernel used by the each convolutional layer.

In some embodiments, said determining the user attention information includes: determining the user attention information by vectorizing the identifier based on a second embedding layer; where the user attention information is a matrix with an m*m size, and m indicates a width of the convolution kernel used by the each convolutional layer; and a second weight matrix of the second embedding layer is different from a first weight matrix of a first embedding layer.

In some embodiments, the second feature matrix is normalized by a following formula:

$$w_{i,s,t} = \exp(v\_\{i,s,t\})/\Sigma_{s',t'} \exp(v\_\{i,s',t'\});$$

where $w_{i,s,t}$ refers to the user attention weight; $v\_\{i, s, t\}$ and $v\_\{i, s', t'\}$ refer to two elements at different positions in the second feature matrix; and s' and t' are positive integers for traversing all elements in the second feature matrix.

In some embodiments, the N generated user preference data are weighted and fused by a following formula:

$$o_i = \frac{r_{ij}^* o_{ij}}{\Sigma_j r_{ij}};$$

where $o_i$ refers to the fused user preference data; j ranges from 1 to N; $o_{ij}$ refers to the user preference data corresponding to a feature output from a $j^{th}$ convolutional layer; $r_{ij}$ refers to a weight corresponding to $o_{ij}$ in the target weight matrix; the target weight matrix is $(r_{i1}, r_{i2}, r_{i3}, \ldots, r_{iL})$; and i refers to the identifier of the recommended user.

In a second aspect, embodiments of the present disclosure provide an apparatus for recommending multimedia resource. The apparatus includes: a processor; and a memory, configured to store executable instructions of the processor, where the processor is configured to read and execute the executable instructions to: acquire features of the multimedia resource based on a convolutional neural network, where the convolutional neural network includes N convolutional layers, where N is a positive integer; determine user interest information based on an identifier of a recommended user, where the user interest information is corresponding to the feature of each convolutional layer; determine a first feature matrix based on the convolution of convolution kernel and the feature, where the convolution kernel includes the user interest information; generate user preference data based on the first feature matrix; and recommend the multimedia resource to the recommended user based on the N generated user preference data.

In some embodiments, the processor is further configured to read and execute the executable instructions to: determine user attention information based on the identifier, where the user attention information matches with the features; generate a user attention weight based on the user attention information and the feature; and generate the user preference data based on the first feature matrix and the user attention weight.

In some embodiments, the processor is further configured to read and execute the executable instructions to: determine a second feature matrix based on the convolution of the convolution kernel and the feature, where the convolution kernel includes the user attention information; and obtain the user attention weight by normalizing the second feature matrix.

In some embodiments, the processor is further configured to read and execute the executable instructions to: reduce a dimension of the first feature matrix by a maximum pooling layer; and determine the user preference data by weighting and fusing the dimension-reduced first feature matrix and the user attention weight.

In some embodiments, the processor is further configured to read and execute the executable instructions to: acquire a target weight matrix, where the target weight matrix provides weights corresponding to the N generated user preference data; weight and fuse the N generated user preference data based on the target weight matrix; and recommend the multimedia resources to the recommended user based on the weighted and fused user preference data.

In some embodiments, the processor is further configured to read and execute the executable instructions to: determine the user interest information by vectorizing the identifier based on a first embedding layer; where the user interest information is a matrix with an m*m size, and m indicates a width of the convolution kernel used by the each convolutional layer.

In some embodiments, the processor is further configured to read and execute the executable instructions to: determine the user attention information by vectorizing the identifier based on a second embedding layer; where the user attention information is a matrix with an m*m size, and m indicates a width of the convolution kernel used by the each convolutional layer; and a second weight matrix of the second embedding layer is different from a first weight matrix of a first embedding layer.

In some embodiments, the second feature matrix is normalized by a following formula:

$$w_{i,s,t} = \exp(v\_\{i,s,t\})/\Sigma_{s',t'} \exp(v\_\{i,s',t'\});$$

where $w_{i,s,t}$ refers to the user attention weight; $v\_\{i, s, t\}$ and $v\_\{i, s', t'\}$ refer to two elements at different positions in the second feature matrix; and s' and t' are positive integers for traversing all elements in the second feature matrix.

In some embodiments, the N number of generated user preference data are weighted and fused by a following formula:

$$o_i = \frac{r_{ij}^* o_{ij}}{\Sigma_j r_{ij}};$$

where $o_i$ refers to the fused user preference data; j ranges from 1 to N; $o_{ij}$ refers to the user preference data corresponding to a feature output from a $j^{th}$ convolutional layer; $r_{ij}$ refers to a weight corresponding to $o_{ij}$ in the target weight matrix; the target weight matrix is $(r_{i1}, r_{i2}, r_{i3}, \ldots, r_{iL})$; and i refers to the identifier of the recommended user.

In a third aspect, embodiments of the present disclosure provide a non-transitory computer readable storage medium. Instructions in the storage medium are executed by a processor of an electronic device to causes the electronic device to perform the method according to the first aspect.

In a fourth aspect, embodiments of the present disclosure provide an application. Instructions in the application are executed by a processor of an electronic device to cause the electronic device to perform the method according to the first aspect.

BRIEF DESCRIPTION OF THE DRAWINGS

The drawings herein are incorporated in and constitute a part of the specification, illustrating embodiments consistent with the present disclosure, and explaining the principles of the present disclosure together with the specification.

DETAILED DESCRIPTION OF THE EMBODIMENTS

Figure 1:
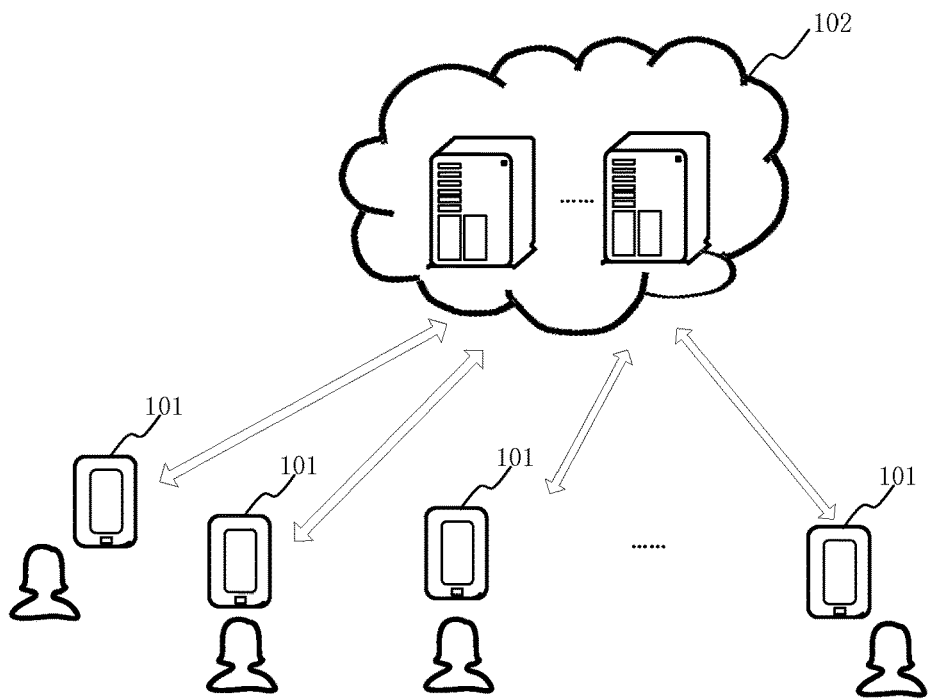
FIG. 1 illustrates a schematic diagram of an implementation environment involved in a method for recommending multimedia resource according to the embodiments of the present disclosure.

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

Before the embodiments of the present disclosure are explained and illustrated in detail, some nouns involved in the embodiments of the present disclosure are explained and illustrated at first.

User interest information: it is used to reflect preferences of a user, and the preferences of the user can usually be reflected through a series of behaviors of the user. The behaviors of the user include, but are not limited to, click, purchase, favorites, subscription, viewing, reading, and the like. As an example, the user interest information may represent a resource type (such as automobile, sports, health, tourism, home, real estate, etc.) that the user is interested in, and the embodiments of the present disclosure do not specifically limit this. In addition, in some embodiments, the user interest information is expressed in a vector form.

User attention information: it is derived from an attention mechanism and is used to reflect the focus of concern or the focus of attention. From the mathematical formula and code implementation, the attention mechanism can be understood as weighted summation, which considers different parts have different significances. In addition, in some embodiments, the user attention information is also expressed in a vector form.

The attention mechanism is from the study of human vision. In the cognitive science, due to the bottleneck of information processing, the human would selective pay attention to a part of all pieces of information while ignoring other pieces of visible information. The above mechanism is often called the attention mechanism. The attention mechanism is a brain signal processing mechanism peculiar to the human vision. The human vision obtains a target region that needs to be focused, i.e., the focus of attention, by quickly scanning a global image, and then invests more attention resources in this region to acquire more detailed information of a target to be focused and suppress other pieces of useless information.

In conclusion, there are two main aspects of the attention mechanism: One is to decide which part of input needs to be paid attention to, and the other one is to allocate limited information processing resources to an important part.

The attention mechanism in deep learning is similar to a selective visual attention mechanism of human in essence. A core goal is to select information that is more critical to the current task from a lot of information.

An implementation environment involved in a method for recommending multimedia resource provided by the embodiments of the present disclosure is described below.

Referring to FIG. 1, the implementation environment includes a terminal 101 and an electronic device 102, where the terminal 101 is used by a recommended user. The form of the electronic device 102 may be a server. The type of the terminal 101 includes, but is not limited to, a smart phone, a desktop computer, a notebook computer, a tablet computer, and the like, and the embodiments of the present disclosure do not specifically limit this. In addition, the electronic device 102 may be also called a system for recommending multimedia resource herein.

In some embodiments, the method for recommending multimedia resource provided by the embodiments of the present disclosure aims at images or videos, that is, the embodiments of the present disclosure provide a mode for recommending an image or a video, that is, a system for recommending an image or a video is used to recommend images or videos to a user.

The embodiments of the present disclosure provide a machine learning model combining a convolutional neural network and a collaborative filtering neural network. The model is used to recommend multimedia resource. The collaborative filtering neural network includes one or more collaborative filtering elements and a fusing element. The fusing element is configured to fuse outputs of the one or more collaborative filtering elements. One collaborative filtering element corresponds to an output of a convolutional layer of the convolutional neural network. In other words, for each collaborative filtering element, the output of the corresponding convolutional layer and a user ID of the recommended user are used as an input. In some embodiments, the user ID may be vectorized through two different embedding layers to respectively generate user_interest_embedding and user_attention_embedding.

First, the embodiments of the present disclosure may allow the user_interest_embedding to correspond to a convolution kernel in the convolutional neural network. That is, the above convolutional structure is considered for the design. The user_interest_embedding is directly used as the convolution kernel to be convoluted with the feature output from each convolutional layer in the convolutional neural network.

Second, the embodiments of the present disclosure further introduce the attention mechanism. That is, the outputs of different regions of the same convolutional layer are subjected to different weighting measures based on user attention embedding. Features are emphasized and suppressed through this method, that is, this method can select and emphasize the useful features more intelligently, and suppress the useless features. During resource recommendation, a better recommendation effect can be achieved.

Third, since the various collaborative filtering elements respectively correspond to the outputs of different convolutional layers, after above processing, the outputs of the various collaborative filtering elements correspond to the preferences of the recommended user to multimedia resources on different semantic hierarchies. The embodiments of the present disclosure fuse the preferences on different semantic hierarchies through a fusing element, thereby improving the entire recommending performance.

In conclusion, the embodiments of the present disclosure can well solve the problem of cold start of the newly emerging multimedia resources. The problem of cold start is that when a new user or a new multimedia resource enters the system for recommending multimedia resource, recommending the multimedia resource cannot be completed due to the lack of the corresponding user behaviors (such as click, subscription, favorites, and purchase, etc.), thus resulting in a failure of a collaborative filtering method. Videos are taken for example. For a newly uploaded video, the collaborative filtering method used in the related art cannot complete recommending the multimedia resource due to the lack of the corresponding user behaviors, and the embodiments of the present disclosure do not have this problem. Either the newly emerging multimedia resource or a historical multimedia resource existing before may be recommended by the above method for recommending multimedia resource in the embodiments of the present disclosure.

In addition, the method for recommending multimedia resource provided by the embodiments of the present disclosure also has extremely high extendibility, and may be combined with various convolutional neural networks. For example, the method is applicable to different scenarios of recommending an image or a video.

The method for recommending multimedia resource provided by the embodiments of the present disclosure is introduced and described in detail through the following exemplary embodiments. It should be noted that first, second, third, and fourth descriptions and similar descriptions in the following embodiments are only for distinguishing different objects, and do not constitute any other limitations.

Figure 2:
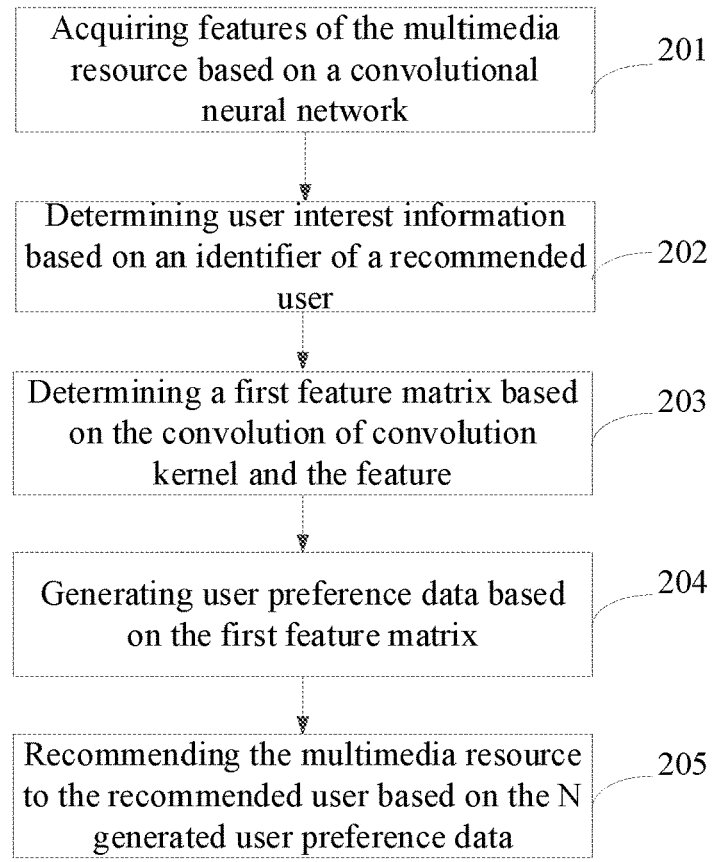
FIG. 2 illustrates a flow diagram of a method for recommending multimedia resource according to the embodiments of the present disclosure.

FIG. 2 is a flow diagram of a method for recommending multimedia resource according to embodiments of the present disclosure. As shown in FIG. 2, the method is used in the apparatus for recommending multimedia resource as shown in FIG. 1, and includes the following steps.

At step 201, acquiring features of the multimedia resource based on a convolutional neural network. The convolutional neural network includes N convolutional layers.

N is a positive integer.

In some embodiments, N is the number of all the convolutional layers included in the convolutional neural network.

At step 202, determining user interest information based on an identifier of a recommended user. The user interest information is corresponding to the feature of each convolutional layer.

At step 203, determining a first feature matrix based on the convolution of convolution kernel and the feature. The convolution kernel includes the user interest information.

At step 204, generating user preference data based on the first feature matrix.

At step 205, recommending the multimedia resource to the recommended user based on the N generated user preference data.

According to the method provided by the embodiments of the present disclosure, for multimedia data, when determining whether the multimedia data is recommended to a user, the multimedia resources are input into the convolutional neural network to acquire features of the multimedia resources; for a feature output from each convolutional layer, the user interest information is determined based on the identifier of the recommended user; the first feature matrix is determined based on the convolution of the convolution kernel and the feature; the corresponding user preference data is generated based on the determined first feature matrix; and the embodiments determine whether to make a recommendation to the user based on the user preference data.

Based on the above analysis, it can be known that in the embodiments of the present disclosure, the user interest information is directly used as the convolution kernel to be convoluted with the feature output from each convolutional layer, thereby forming preferences of the user to the multimedia resources on different semantic hierarchies, and then recommending the multimedia resources based on a fusing result by fusing the preferences on different semantic hierarchies. Therefore, the problem of cold start can be avoided, the recommending performance can also be obviously improved, and the recommending accuracy is relatively high, so that the effect of the recommending mode of the multimedia resources is relatively good.

In some embodiments, the method further includes the following step.

The user attention information is determined based on the identifier, where the user attention information matches with the features.

A user attention weight is generated based on the user attention information and the feature.

The user preference data are generated based on the first feature matrix and the user attention weight.

In some embodiments, generating the user attention weight includes that: a second feature matrix is determined based on the convolution of the convolution kernel and the feature, where the convolution kernel includes the user attention information; and the user attention weight is obtained by normalizing the second feature matrix.

In some embodiments, generating the user preference data includes that: a dimension of the first feature matrix is reduced by a maximum pooling layer; and the user preference data are determined by weighting and fusing the dimension-reduced first feature matrix and the user attention weight.

In some embodiments, recommending the multimedia resource to the recommended user includes that: a target weight matrix is acquired, where the target weight matrix provides weights corresponding to the N number of generated user preference data; the N generated user preference data are weighted and fused based on the target weight matrix; and the multimedia resource is recommended to the recommended user based on the weighted and fused user preference data.

In some embodiments, determining the user interest information includes that: the user interest information is determined by vectorizing the identifier based on a first embedding layer, where the user interest information is a matrix with an m*m size, and m refers to the width of the convolution kernel used by the each convolutional layer.

In some embodiments, determining the user attention information includes that: the user attention information is determined by vectorizing the identifier based on a second embedding layer.

The user attention information is a matrix with an m*m size, and m refers to a width of the convolution kernel used by the each convolutional layer. The second weight matrix of the second embedding layer is different from the first weight matrix of the first embedding layer.

In some embodiments, the following formula is used to normalize the second feature matrix:

$$w_{i,s,t} = \exp(v\_\{i,s,t\})/\Sigma_{s',t'} \exp(v\_\{i,s',t'\});$$

$w_{i,s,t}$ refers to the user attention weight; $v\_\{i, s, t\}$ and $v\_\{i, s', t'\}$ refer to two elements at different positions in the second feature matrix; and s' and t' are positive integers for traversing all elements in the second feature matrix.

In some embodiments, the following formula is used to weight and fuse the N generated user preference data:

$$o_i = \frac{r_{ij}^* o_{ij}}{\Sigma_j r_{ij}}.$$

$o_i$ refers to the fused user preference data; j ranges from 1 to N; $o_{ij}$ refers to the user preference data corresponding to the a feature output from the jth convolutional layer; $r_{ij}$ refers to a weight corresponding to $o_{ij}$ in the target weight matrix; the target weight matrix is $(r_{i1}, r_{i2}, r_{i3}, \ldots, r_{iL}$; and i refers to the identifier of the recommended user.

All the above optional schemes, optional embodiments of the present disclosure may be formed by using any combination, and are not repeated one by one here.

Figure 3:
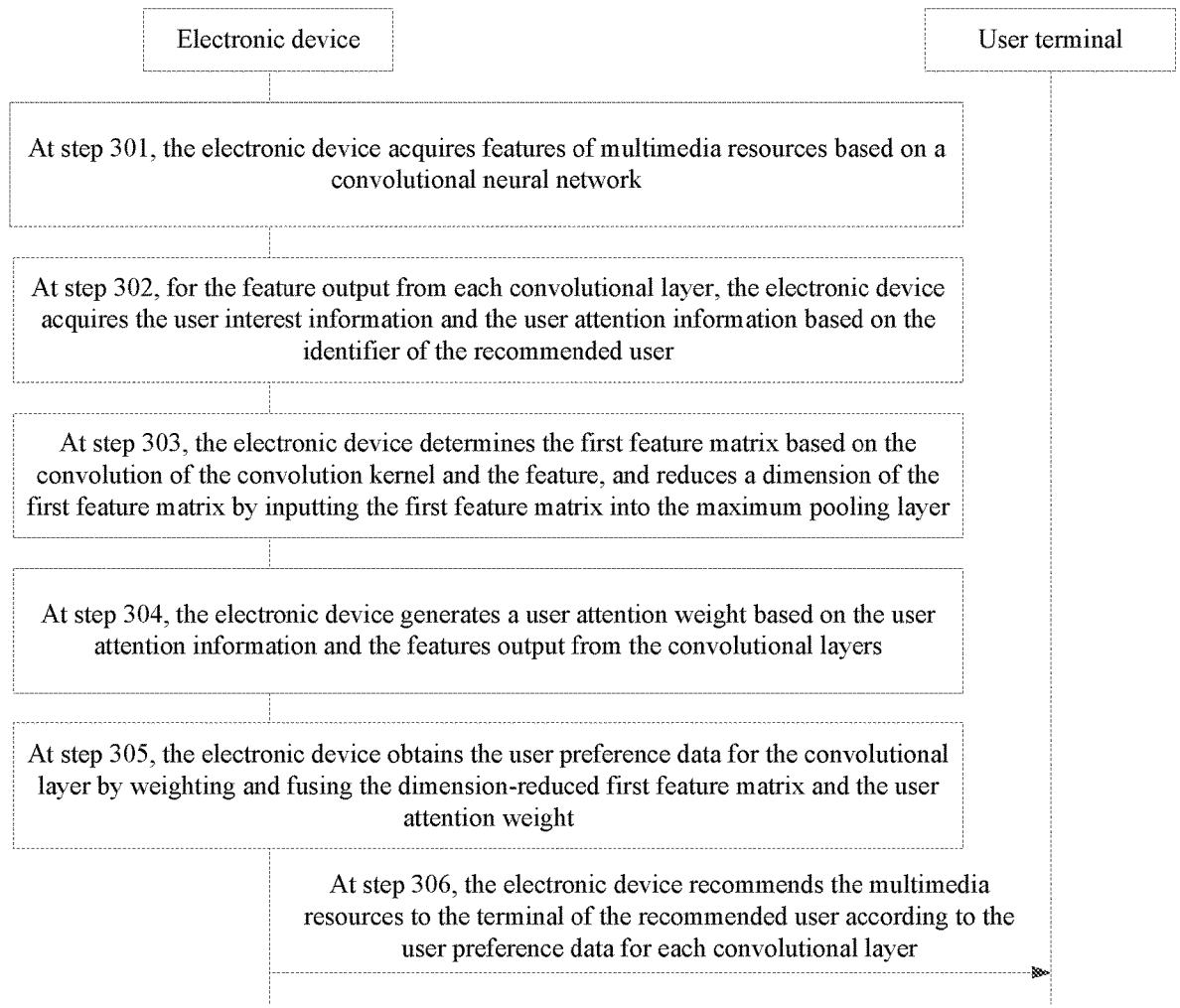
FIG. 3 illustrates a flow diagram of a method for recommending multimedia resource according to the embodiments of the present disclosure.

FIG. 3 is a flow diagram of a method for recommending multimedia resource according to the embodiments of the present disclosure. As shown in FIG. 3, main interaction bodies of the method include the user terminal 101 and the electronic device 102 as shown in FIG. 1. The method includes the following steps.

At step 301, the electronic device acquires features of multimedia resources based on a convolutional neural network. The convolutional neural network includes N convolutional layers.

If images or videos serving as the multimedia resources are taken as an example, the convolutional neural network configured for extracting features of the images or videos includes, but is not limited to, Inception, VGGNet, ResNet, and the like. Inception is a core structure of GoogLeNet, and is configured to increase the depth and the width of a network, to thereby improve the performance of a deep neural network.

Figure 4:
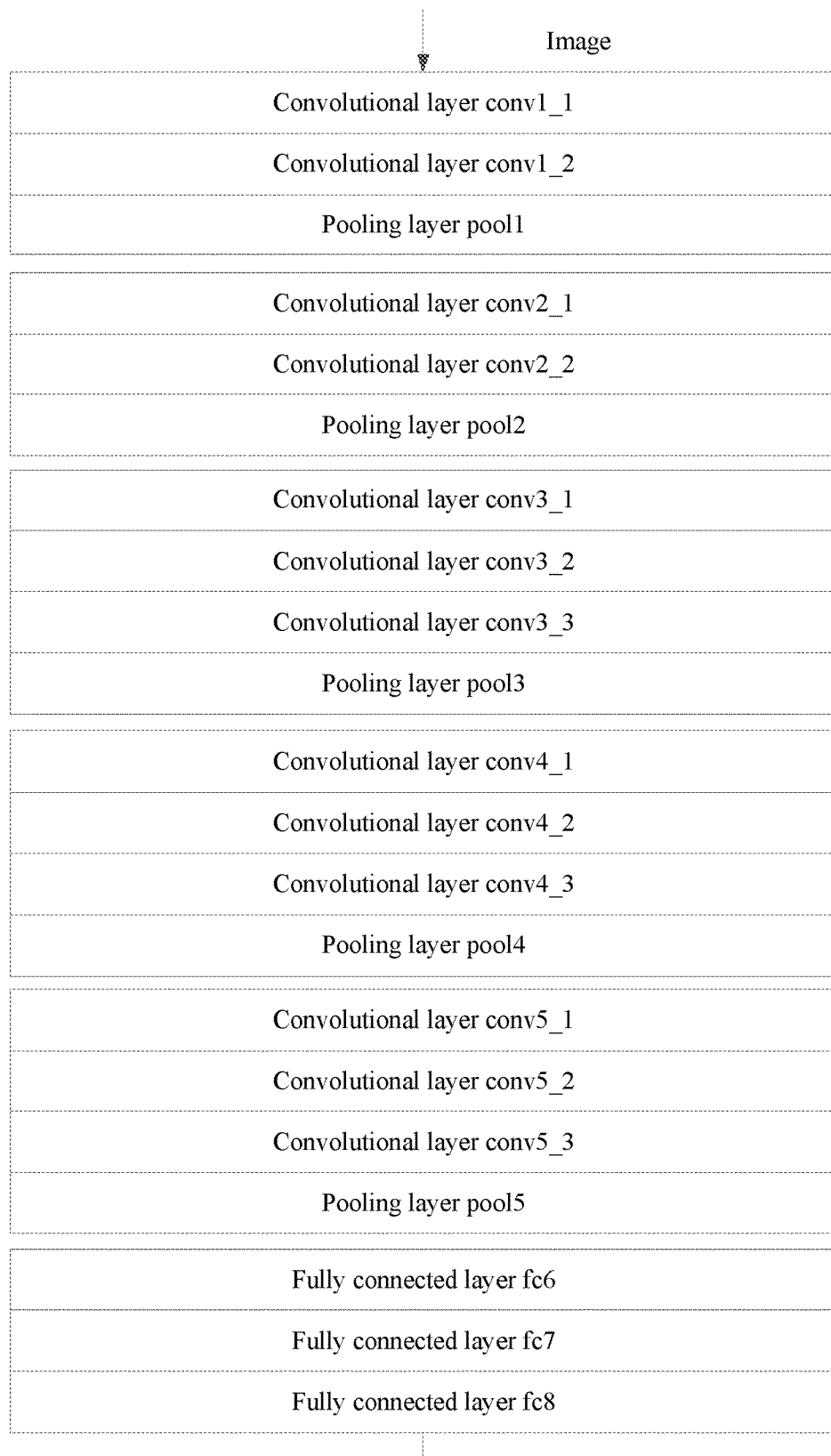
FIG. 4 is a schematic structural diagram of a convolutional neural network according to the embodiments of the present disclosure.

In some embodiments, the VGGNet configured for extracting features is taken as an example. Referring to FIG. 4, VGGNet includes 5 layers of convolutional layers including totally 13 convolutional layers and 3 fully connected layers. The 5 layers of convolutional layers are separated by pooling layers, and each convolutional layer uses a small convolution kernel of a 3*3 size.

Figure 5:
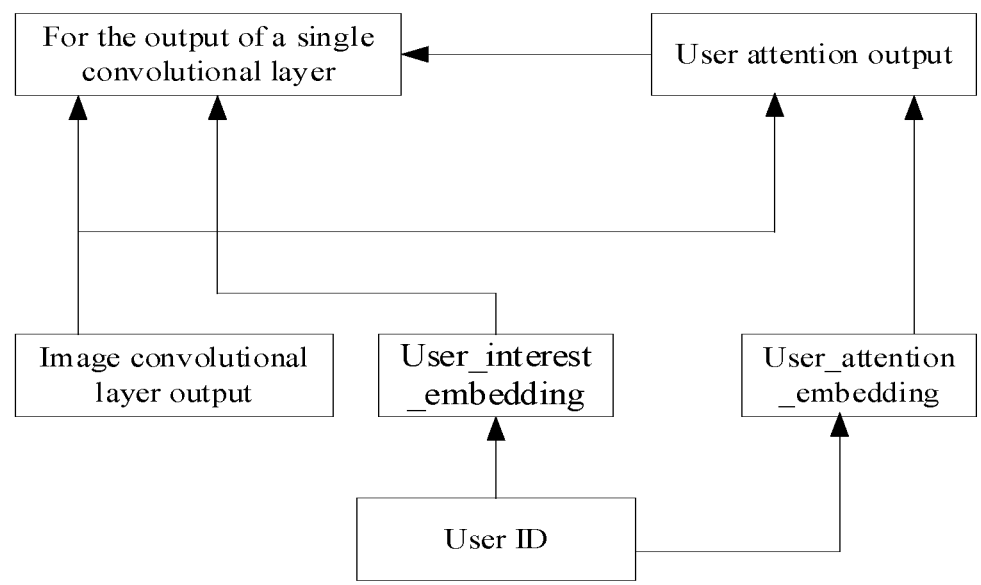
FIG. 5 is a schematic structural diagram of a collaborative filtering module illustrated according to the embodiments of the present disclosure.

In the embodiments of the present disclosure, for the feature output from each convolutional layer of the convolutional neural network, the corresponding collaborative filtering element in the collaborative filtering neural network is used to process it, that is, one collaborative filtering element corresponds to the output of one convolutional layer. FIG. 5 shows a detailed processing flow of the single collaborative filtering element. The function of the single collaborative filtering element is illustrated below in combination with step 302 to step 305.

Collaborative filtering element of a single convolutional layer.

At step 302, for the feature output from each convolutional layer, the electronic device acquires the user interest information and the user attention information based on the identifier of the recommended user. The user interest information corresponds to the feature output from the each convolutional layer, and the user attention information matches with the features of multimedia resources.

In the embodiments of the present disclosure, inputs of the collaborative filtering elements include the outputs of a certain convolutional layer in the convolutional neural network and the identifier, i.e., an ID, of the recommended user.

In some embodiments, a procedure for authorizing a user would be usually added based on the consideration of information security and for ease of use of related user information when the electronic device processes service logic. For example, in some embodiments, the electronic device may acquire the identifier of the user after authorizing a user. As an example, for authorizing a user, the electronic device may send an authorizing page to a terminal of the user, and the terminal displays this authorization page. An authorizing option is usually set in the authorizing page. When the user selects this option, the terminal confirms that the user completes authorizing, and would feed back information to the electronic device, so that the electronic device acquires the related user information.

In some embodiments, the user ID may be vectorized through two different embedding layers to respectively generate the user interest information and the user attention information. The user interest information is also called user_interest_embedding herein, and the user attention information is also called user_attention_embedding herein.

It should be noted that firstly, in order to distinguish the above two different embedding layers, the first embedding layer and the second embedding layer are respectively named.

The user_interest_embedding may be represented by:
user_interest_embedding=$((u_{i,1,1}, u_{i,1,2}, \ldots, u_{i,1,m'}) \ldots, (u_{i,m,1}, u_{i,m,2}, \ldots, u_{i,m,m'}))$.

The user_attention_embedding may be represented by:
user_attention_embedding=$((a_{i,1,1}, a_{i,1,2}, \ldots, a_{i,1,m'}), \ldots, (a_{i,m,1}, a_{i,m,2}, \ldots, a_{i,m,m'}))$.

Where i refers to the identifier of the recommended user; and m refers to the width of the convolution kernel used by the corresponding convolutional layer. That is, the user_interest_embedding and the user_attention_embedding are matrixes with an m*m size.

In other words, the following methods may be used to acquire the user_interest_embedding and the user_attention_embedding based on the identifier of the recommended user, where the user_interest_embedding and the user_attention_embedding match with the features output from the convolutional layers.

The user_interest_embedding is obtained by vectorizing the user ID via the first embedding layer. The user_attention_embedding is obtained by vectorizing the user ID via the second embedding layer.

It should be noted that secondly, the first embedding layer and the second embedding layer each include a trainable weight matrix. The weight matrixes included in the first embedding layer and the second embedding layer are different, that is, weight parameters of the different embedding layers are independent. At the beginning of training, the weight parameters of the weight matrixes of the two embedding layers may be randomly initialized. All the embedding layers in the collaborative filtering neural network are jointly trained based on a training sample. An optimization process of the weight parameters may refer to a multi-layer feed forward neural network. A gradient of output errors is transmitted to each layer of the network through back propagation, so as to calculate the gradient and update the weight parameters.

At step 303, the electronic device determines the first feature matrix based on the convolution of the convolution kernel and the feature, and reduces a dimension of the first feature matrix by inputting the first feature matrix into the maximum pooling layer. The convolution kernel includes the user interest information.

In some embodiments, after the user interest information is obtained, the user interest information may be used as the convolution kernel to be convoluted with the outputs of the corresponding convolutional layers.

A computational formula involved in the convoluting operation is as follows:

$$y_{i,s,t}=\Sigma_{k=1}^{m}\Sigma_{l=1}^{m}u_{i,k,l}x_{s+k-1,t+l-1}.$$

Where $y_{i,s,t}$ refers to a convoluting result of the above convoluting operation. This convoluting result is also called the first feature matrix herein; and $u_{i,k,l}$ refers to the user interest information; $x_{s+k-1,t+l-1}$ refers to the features output from the convolutional layers; ranges of s and t are related to the size of the features output from the convolutional layers. It is assumed that the features output from the convolutional layers is a matrix with an n*n size, and the user interest information is a matrix with an m*m size, s and t range from 1 to m−n+1, that is, the first feature matrix is of an (m−n+1)*(m−n+1) size.

Then, $y_{i,s,t}$ will be subjected to dimension-reducing processing through a maximum pooling layer. A formula involved is as follows:

$$z_{i,s,t}=\max_{1\leq k\leq m1\leq k\leq m}y_{s+k-1,t+l-1}.$$

At step 304, the electronic device generates the user attention weight based on the user attention information and the features output from the convolutional layers.

In some embodiments, the user_attention_embedding may generate an attention weight of each element $z_{\{i, s, t\}}$ of an output vector $z_{i,s,t}$ based on the attention mechanism.

In some embodiments, generating the user attention weight based on the user attention information and the features output from the convolutional layers includes the following steps.

3041, the second feature matrix is obtained based on the convolution of the convolution kernel and the features output from the convolutional layers. The convolution kernel includes the user attention information.

A formula involved in the convoluting operation is as follows:

$$v_{i,s,t} = \Sigma_{k=1}^{m} \Sigma_{l=1}^{m} a_{i,k,l} x_{s+k-1,t+l-1}.$$

Where $v_{i,s,t}$ refers to the convoluting result of the above convoluting operation. This convoluting result is also called the second feature matrix herein; and $a_{i,k,l}$ refers to the user attention information; $x_{s+k-1,t+l-1}$ also refers to the output of the convolutional layer; s and t both range from 1 to m−n+1. The second feature matrix is also of the (m−n+1)*(m−n+1) size.

3042, the user attention weight is obtained by normalizing the second feature matrix.

In some embodiments, the following formula is used to normalize the second feature matrix:

$$w_{i,s,t} = \exp(v\_\{i,s,t\}) / \Sigma_{s',t'} \exp(v\_\{i,s',t'\});$$

Where $w_{i,s,t}$ refers to the user attention weight corresponding to an element at any position in the output vector $z_{i,s,t}$; $v\_\{i, s, t\}$ and $v\_\{i, s', t'\}$ refer to two elements at different positions in $v_{i,s,t}$; s' and t' are positive integers to traverse all the elements, i.e., s' and t' also range from 1 to m−n+1; and $w_{i,s,t}$ is also a matrix with an (m−n+1)*(m−n+1) size.

It should be noted that the user attention weight corresponds to the user attention output as shown in FIG. 4.

At step 305, the electronic device obtains the user preference data for the convolutional layer by weighting and fusing the dimension-reduced first feature matrix and the user attention weight.

In some embodiments, after the output vectors $z_{i,s,t}$ and $w_{i,s,t}$ are obtained, the two output vectors are fused. That is, the outputs of the convolutional layers are obtained by fusing the output vector $z_{i,s,t}$ by using the user attention weight. The outputs represent a preference degree of the recommended user to the output features of the corresponding convolutional layers, so that the outputs are also called the user preference data for the convolutional layers herein. That is, the user preference data are actually the matrixes.

In some embodiments, a fusing formula of the output vectors $z_{i,s,t}$ and $w_{i,s,t}$ is as follows:

$$o_{ij} = \Sigma_{i,s,t} w_{i,s,t} z_{i,s,t}.$$

Where $o_{ij}$ refers to the user preference data of the jth convolutional layer, and j ranges from 1 to N.

It should be noted that firstly, the above step 302 to step 305 describe that the single collaborative filtering element act on the outputs of the single convolutional layers in the convolutional neural network. In some embodiments, the collaborative filtering element may act on the output of each convolutional layer of the convolutional neural network. That is, the user_interest_embedding may be used as the convolution kernel to act on the outputs of the different convolutional layers, thus obtaining the user preference data for the different convolutional layers. The user preference data correspond to the preferences of the recommended user to the multimedia resources on the different semantic hierarchies. That is, the embodiments of the present disclosure may realize collaborative filtering on the different semantic hierarchies.

It should be noted that secondly, the embodiments of the present disclosure also introduces the user_attention_embedding. The user_attention_embedding is used to fuse the outputs of the different regions of the same convolutional layer.

It should be noted that thirdly, for the different collaborative filtering modules, different user_interest_embeddings may be further extracted, that is, the user_interest_embedding for each convolutional layer may be different. In some embodiments, one or more user_interest_embeddings may be designed to process the outputs of different convolutional layers of the convolutional neural network. That is, for the same user ID, the different embedding layers are used to obtain the different user_interest_embeddings to realize the collaborative filtering respectively on different semantic hierarchies. The weight matrixes between different embedding layers are different. In addition, embedding dimensions of the same user on the different embedding layers may be different. That is, dimensions of the user_interest_embeddings of different layers may be inconsistent.

Fusion of collaborative filtering outputs of the plurality of convolutional layers.

At step 306, the electronic device recommends the multimedia resources to the terminal of the recommended user according to the user preference data for each convolutional layer.

Figure 6:
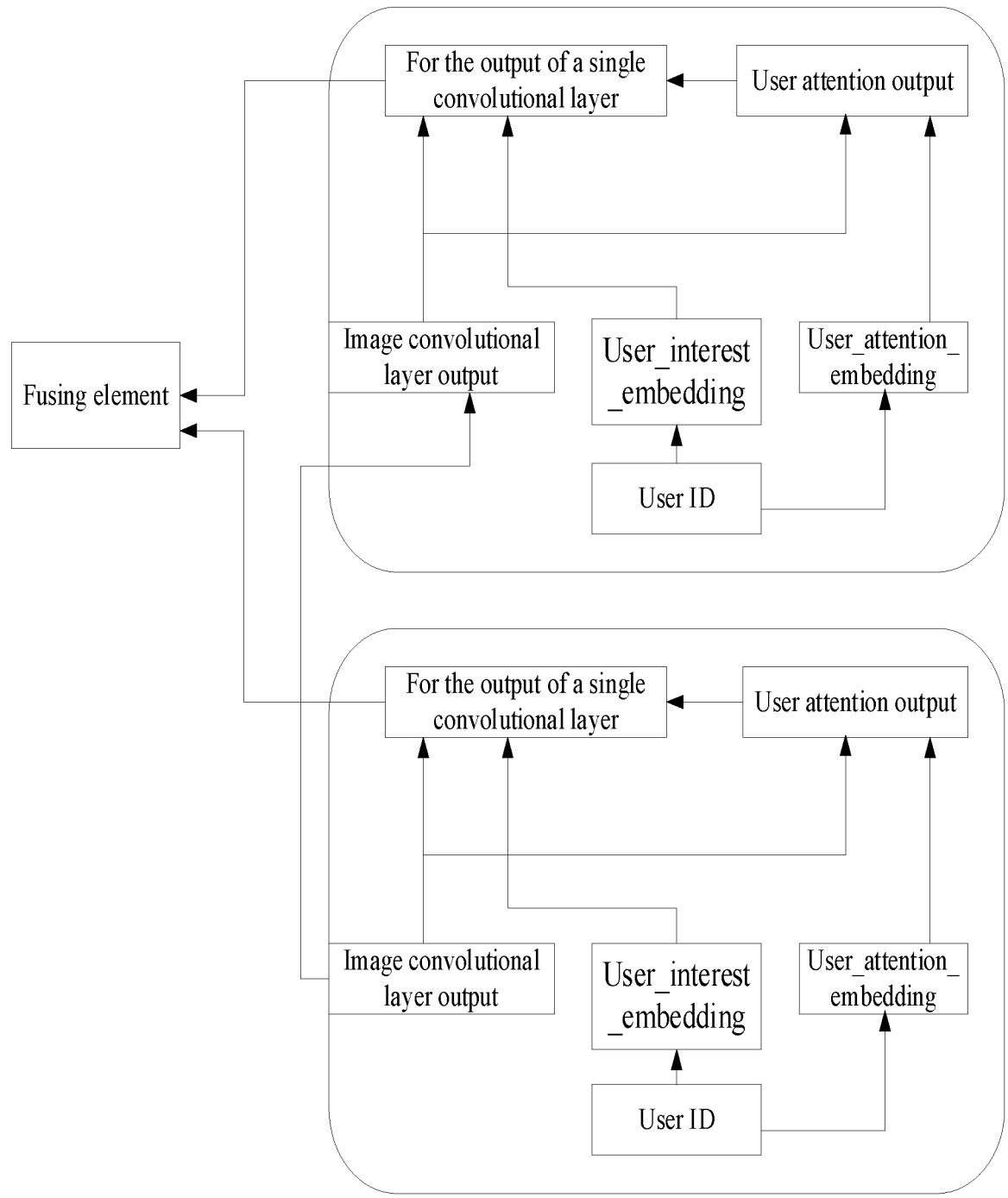
FIG. 6 is a schematic structural diagram of a collaborative filtering neural network according to the embodiments of the present disclosure.

Referring to FIG. 6, after the user preference data for the various convolutional layers are obtained, the data may be fused through one fusion module. In some embodiments, a method for fusing the user preference data includes, but is not limited to, that: the target weight matrix is acquired, and the target weight matrix provides the weight corresponding to each piece of user preference data; and each piece of user preference data is weighted and fused based on the target weight matrix.

The target weight matrix is configured to fuse the outputs for the different convolutional layers. This weight matrix is obtained by joint learning together with other parameters in the collaborative filtering neural network. A random initialization method may be used during initialization of the weight matrix, or the weight matrix is initialized into vectors of 1. The embodiments of the present disclosure do not specifically limit this.

As an example, the embodiments of the present disclosure uses the following formula to weight and fuse the user preference data:

$$o_i = \frac{r_{ij}^* o_{ij}}{\Sigma_j r_{ij}}.$$

Where $o_i$ refers to the fused user preference data; $r_{ij}$ refers to a weight corresponding to $o_{ij}$ in the target weight matrix; the target weight matrix is $(r_{i1}, r_{i2}, r_{i3}, \ldots, r_{iN})$, which is configured to weight $o_{ij}$ of the different convolutional layers.

As an example, when the multimedia resources are recommended to the recommended user based on the fused user preference data, subsequent processing methods are also different according to different application scenarios.

It is assumed that a training target at a training stage is a preference score in the form of real number. That is, a model including the convolutional neural network and the collaborative filtering neural network finally outputs a predicted score scored by the user to the multimedia resources, so that the fusion module then may output this preference score through the fully connected layers, and the electronic device makes a recommendation according to the obtained preference score in the form of real number. In some embodiments, when the obtained preference score is greater than a preset threshold value, the corresponding multimedia resources are recommended to the user, or, no multimedia resource is recommended.

It is assumed that the training target at the training stage is 0 or 1. In some embodiments, by taking click as an example, 0 may represent no click, and 1 may represent click. By taking favorites as an example, 0 may represent no favorites, and 1 may represent favorites. By taking purchase as an example, 0 may represent no purchase, and 1 may represent purchase. The embodiments of the present disclosure do not specifically limit this. For this case, the fusion module may output 0 or 1 through the fully connected layers and a softmax layer. By taking click as an example, if the model outputs 1, it is indicated that the model predicts that the user will click the corresponding multimedia resources, and the electronic device recommends the multimedia resources to the user.

For the different application scenarios, loss functions used at the training stage are usually different. By taking the recommendation based on the score as an example, model training may be performed by using a quadratic loss function. An expression of the quadratic loss function is $L=(s_i-t_i)^2$, where $s_i$ refers to a user score predicted by the model, and $t_i$ refers to an actual user score.

The method provided by the embodiments of the present disclosure at least has the following beneficial effects.

The embodiments of the present disclosure may allow the user_interest_embedding to correspond to the convolution kernel in the convolutional neural network. That is, the above convolutional structure is considered for the design. The user_interest_embedding is directly used as the convolution kernel to be convoluted with the output of each convolutional layer in the convolutional neural network. In other words, the various collaborative filtering modules in the collaborative filtering neural network respectively correspond to the outputs of the different convolutional layers in the convolutional neural network, and the outputs of the various collaborative filtering modules correspond to the preferences of the recommended user to the multimedia resources on the different semantic hierarchies. Later, by the fusion of the preferences on different semantic hierarchies, the recommendation is made based on the fusion result, so that the problem of cold start may be perfectly solved, and the recommending performance may also be obviously improved. This method for recommending multimedia resource is relatively good in effect.

In addition, the embodiments of the present disclosure further introduce the attention mechanism. That is, the outputs of the different regions of the same convolutional layer are subjected to the different weighting measures based on the user attention embedding. The features are emphasized and suppressed through this method, that is, this method can select and emphasize the useful features more intelligently, and suppress the useless features. During recommending multimedia resource, a better recommending effect can be achieved.

In conclusion, the embodiments of the present disclosure can well solve the problem of cold start of the newly emerging multimedia resource, and has the good recommending performance. This method for recommending multimedia resource is relatively good in effect.

For the problem of cold start, the videos are taken for example. For a newly uploaded video, a collaborative filtering method used in the related art cannot complete the recommendation due to the lack of the corresponding user behaviors, and the embodiment of the present disclosure does not have this problem. Either the newly emerging multimedia resource or the historical multimedia resource existing before may be recommended by the above recommending method. In addition, the recommending method provided by the embodiments of the present disclosure also has extremely high extendibility, and may be combined with the various convolutional neural networks. For example, the method is applicable to the different scenarios of image/video recommendation.

Figure 7:
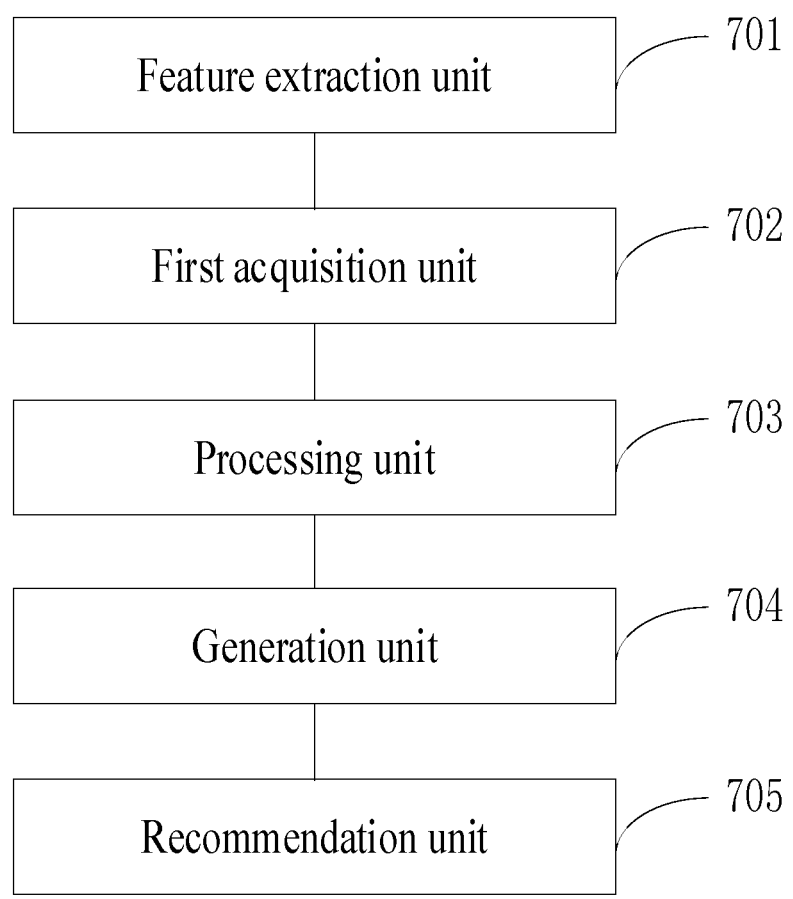
FIG. 7 is a block diagram of an apparatus for recommending multimedia resource according to the embodiments of the present disclosure.

FIG. 7 is a block diagram of an apparatus for recommending multimedia resource according to the embodiments of the present disclosure. Referring to FIG. 7, the apparatus includes: a feature extraction unit 701, a first acquisition unit 702, a processing unit 703, a generation unit 704, and a recommendation unit 705.

The feature extraction unit 701 is configured to acquire features of multimedia resource based on a convolutional neural network, where the convolutional neural network includes N convolutional layers and N is a positive integer.

The first acquisition unit 702 is configured to determine user interest information based on an identifier of a recommended user, where the user interest information is corresponding to the feature of each convolutional layer.

The processing unit 703 is configured to determine a first feature matrix based on the convolution of convolution kernel and the feature, where the convolution kernel includes the user interest information.

The generating unit 704 is configured to generate user preference data based on the first feature matrix.

The recommendation unit 705 is configured to recommend the multimedia resource to the recommended user based on the N generated user preference data.

For multimedia data, when determining whether the multimedia data is recommended to a user, the multimedia resources are input into the convolutional neural network to acquire features of the multimedia resources; for a feature output from each convolutional layer, the user interest information is determined based on the identifier of the recommended user; the first feature matrix is determined based on the convolution of the convolution kernel and the feature; the corresponding user preference data is generated based on the determined first feature matrix; and the embodiments determine whether to make a recommendation to the user based on the user preference data.

Based on the above analysis, it can be known that in the embodiments of the present disclosure, the user interest information is directly used as the convolution kernel to be convoluted with the feature output from each convolutional layer, thereby forming preferences of the user to the multimedia resources on different semantic hierarchies, and then recommending the multimedia resources based on a fusing result by fusing the preferences on different semantic hierarchies. Therefore, the problem of cold start can be avoided, the recommending performance can also be obviously improved, and the recommending accuracy is relatively high, so that the effect of the recommending mode of the multimedia resources is relatively good.

Figure 8:
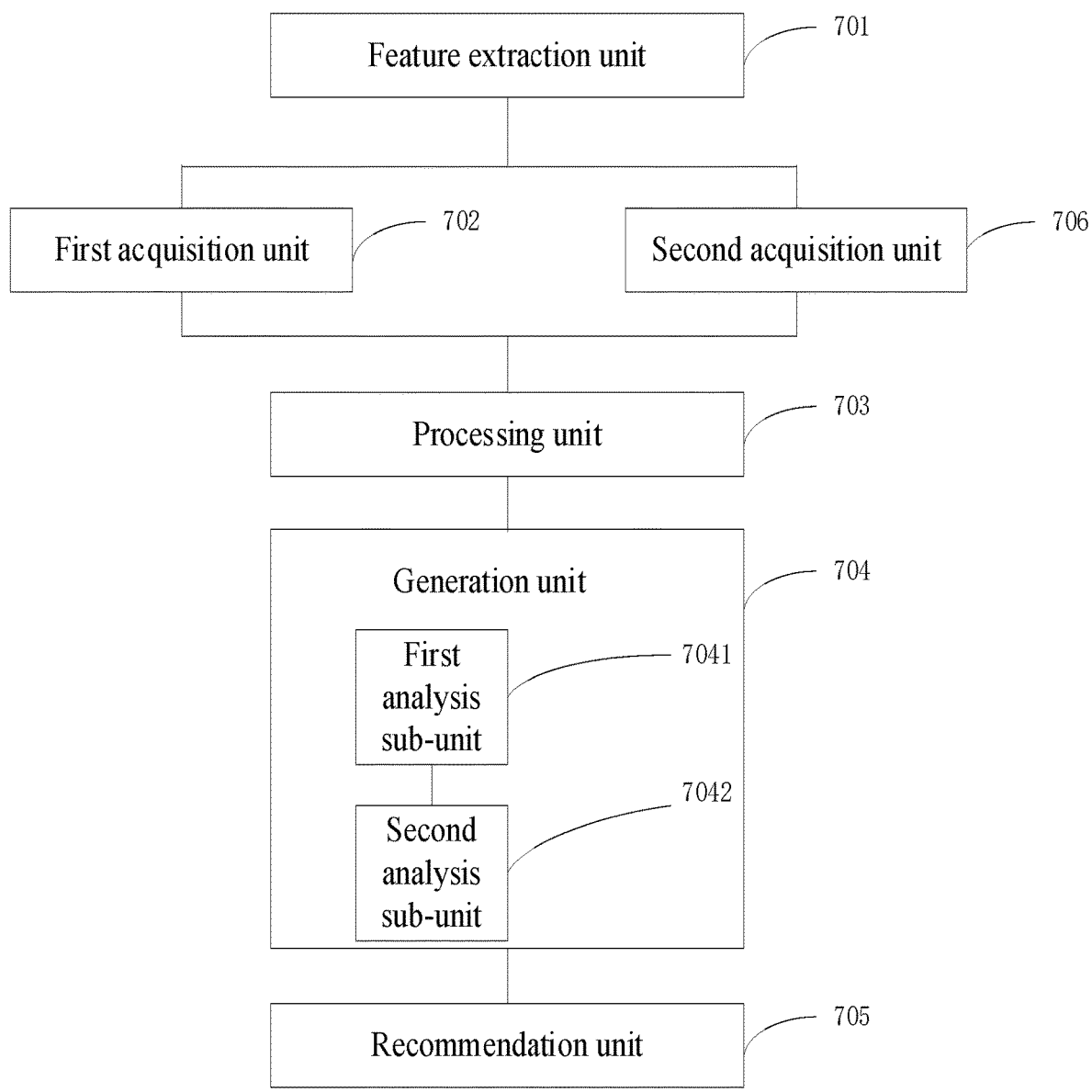
FIG. 8 is a block diagram of an apparatus for recommending multimedia resource according to the embodiments of the present disclosure.

In some embodiments, referring to FIG. 8, the apparatus further includes: a second acquisition unit 706, configured to determine user attention information based on the identifier, where the user attention information matches with the features.

The generation unit 704 includes: a first generation subunit 7041, configured to generate a user attention weight based on the user attention information and the feature; and a second generation sub-unit 7042, configured to generate the user preference data based on the first feature matrix and the user attention weight.

In some embodiments, the first generation sub-unit 7041 is configured to determine a second feature matrix based on the convolution of the convolution kernel and the feature, and obtain the user attention weight normalizing the second feature matrix. The convolution kernel includes the user attention information.

In some embodiments, the second generation sub-unit 7042 is further configured to reduce a dimension of the first feature matrix by a maximum pooling layer, and determine the user preference data by weighting and fusing the dimension-reduced first feature matrix and the user attention weight.

In some embodiments, the recommendation unit 705 is further configured to acquire a target weight matrix, where the target weight matrix provides the weights corresponding to the N generated user preference data; weight and fuse the N generated user preference data based on the target weight matrix, and recommend the multimedia resource to the recommended user based on the weighted and fused user preference data.

In some embodiments, the first acquisition unit 702 is further configured to determine the user interest information by vectorizing the identifier based on a first embedding layer. The user interest information is the matrix with an m*m size, and m refers to the width of the convolution kernel used by the each convolutional layer.

In some embodiments, the second acquisition unit 706 is further configured to determine the user interest information by vectorizing the identifier based on a second embedding layer. The user interest information is a matrix with an m*m size, and m refers to the width of the convolution kernel used by the each convolutional layer. The weight matrix of the second embedding layer is different from the weight matrix of the first embedding layer.

In some embodiments, the first generation sub-unit 7041 uses the following formula to normalize the second feature matrix:

$$w_{i,s,t} = \exp(v\_\{i,s,t\})/\Sigma_{s',t'} \exp(v\_\{i,s',t'\});$$

Where $w_{i,s,t}$ refers to the user attention weight; $v\_\{i, s, t\}$ and $v\_\{i, s', t'\}$ refer to two elements at different positions in the second feature matrix; and s' and t' are both positive integers for traversing all elements in the second feature matrix.

In some embodiments, the recommendation unit 705 is further configured to use the following formula to weight and fuse the N user preference data:

$$o_i = \frac{r_{ij}^* o_{ij}}{\Sigma_j r_{ij}}.$$

Where $o_i$ refers to the fused user preference data; j is from 1 to N; refers to the user preference data corresponding to the feature output from the jth convolutional layer; $r_{ij}$ refers to a weight in the target weight matrix, which corresponds to $o_{ij}$; the target weight matrix is $(r_{i1}, r_{i2}, r_{i3}, \ldots, r_{iL})$; and i refers to the identifier of the recommended user.

All the above optional technical solutions, optional embodiments of the present disclosure may be formed by using any combination, and are not repeated one by one here.

As for the apparatus in the above embodiments, a specific method used by each element to execute operations has been described in detail in the embodiments of the method, and will not be elaborated here.

Figure 9:
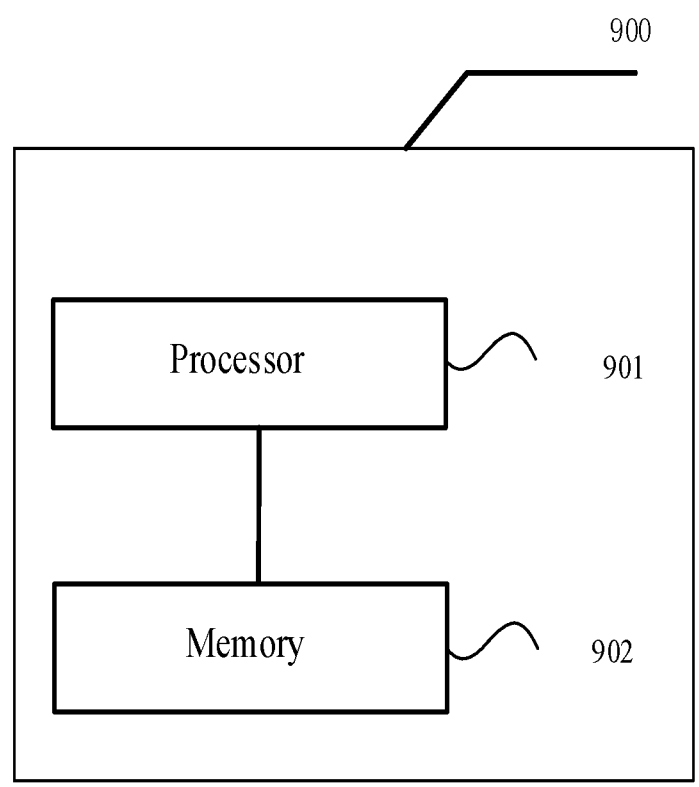
FIG. 9 is a block diagram of an electronic device according to the embodiments of the present disclosure.

FIG. 9 is a schematic structural diagram of an electronic device provided by the embodiments of the present disclosure. The device 900 may generate a relatively large difference due to different configurations or performance, and may include one or more processors 901, such as central processing units (CPUs), and one or more memories 902. The memory 902 stores N instructions that are loaded by the processor 901 and executed to implement the method for recommending multimedia resource provided by each of the embodiments of the above method.

Of course, the device may further have a wired or wireless network interface, a keyboard, an input/output interface, and the like, so as to realize inputting and outputting. The device may further include other components for realizing device functions, so no more repetitions are made here.

In some embodiments, a non-transitory computer readable storage medium is further provided, such as a memory including instructions. The instructions, when executed by a central processing unit (CPU) in an electronic device, may implement the method for recommending multimedia resource in the above embodiments. For example, the computer readable storage medium may be a read-only memory (ROM), a random access memory (RAM), a CD-ROM, a magnetic tape, a floppy disk, an optical data storage device, and the like.

Those skilled in the art will easily think of other schemes of the present disclosure after considering the specification and practicing the disclosure disclosed here. The present disclosure is intended to cover any variations, uses, or adaptive changes of the present disclosure. These variations, uses, or adaptive changes follow the general principles of the present disclosure and include common general knowledge or conventional technical means in the field, which are not disclosed herein. The specification and the embodiments are considered as being exemplary only, with a true scope and spirit of the present disclosure being indicated by the following claims.

It should be understood that the present disclosure is not limited to the precise structure that has been described above and shown in the drawings, and various modifications and changes can be made without departing from the scope thereof. The scope of the present disclosure is limited only by the appended claims.

We claim:

1. A method for recommending multimedia resource, comprising:
   acquiring features of the multimedia resource based on a convolutional neural network, wherein the convolutional neural network comprises N convolutional layers, wherein N is a positive integer;
   determining user interest information based on an identifier of a recommended user, wherein the user interest information is corresponding to the feature of each convolutional layer;
   determining a first feature matrix based on the convolution of convolution kernel and the feature, wherein the convolution kernel comprises the user interest information;
   generating user preference data based on the first feature matrix; and
   recommending the multimedia resource to the recommended user based on the N generated user preference data;

further comprising:
  determining user attention information based on the identifier, wherein the user attention information matches with the features;
  generating a user attention weight based on the user attention information and the feature; and
  generating the user preference data based on the first feature matrix and the user attention weight.

2. The method according to claim 1, wherein said generating the user attention weight comprises:
  determining a second feature matrix based on the convolution of the convolution kernel and the feature, wherein the convolution kernel comprises the user attention information; and
  obtaining the user attention weight by normalizing the second feature matrix.

3. The method according to claim 2, wherein the second feature matrix is normalized by a following formula:

$$w_{i,s,t}=\exp(v\_\{i,s,t\})/\Sigma_{s',t'}\exp(v\_\{i,s',t'\});$$

wherein refers to the user attention weight; $v\_\{i, s, t\}$ and $v\_\{i, s', t'\}$ refer to two elements at different positions in the second feature matrix; and s' and t' are positive integers for traversing all elements in the second feature matrix.

4. The method according to claim 1, wherein said generating the user preference data comprises:
  reducing a dimension of the first feature matrix by a maximum pooling layer; and
  determining the user preference data by weighting and fusing the dimension-reduced first feature matrix and the user attention weight.

5. The method according to claim 1, wherein said recommending the multimedia resource to the recommended user comprises:
  acquiring a target weight matrix, wherein the target weight matrix provides weights corresponding to the N generated user preference data;
  weighting and fusing the N generated user preference data based on the target weight matrix; and
  recommending the multimedia resource to the recommended user based on the weighted and fused user preference data.

6. The method according to claim 5, wherein weighting and fusing the N generated user preference data by a following formula:

$$o_i = \frac{r_{ij}^* o_{ij}}{\Sigma_j r_{ij}};$$

wherein $o_i$ refers to the fused user preference data; j ranges from 1 to N; $o_{ij}$ refers to the user preference data corresponding to a feature output from a jth convolutional layer; $r_{ij}$ refers to a weight corresponding to $o_{ij}$ in the target weight matrix; the target weight matrix is $(r_{i1}, r_{i2}, r_{i3}, \ldots, r_{iL})$; and i refers to the identifier of the recommended user.

7. The method according to claim 1, wherein said determining the user interest information comprises:
  determining the user interest information by vectorizing the identifier based on a first embedding layer, wherein the user interest information is a matrix with an m*m size, and m indicates a width of the convolution kernel used by the each convolutional layer.

8. The method according to claim 1, wherein said determining the user attention information comprises:
  determining the user attention information by vectorizing the identifier based on a second embedding layer;
  wherein the user attention information is a matrix with an m*m size, and m indicates a width of the convolution kernel used by the each convolutional layer; and a second weight matrix of the second embedding layer is different from a first weight matrix of a first embedding layer.

9. An apparatus for recommending multimedia resource, comprising:
  a processor; and
  a memory, configured to store executable instructions of the processor,
  wherein the processor is configured to read and execute the executable instructions to:
  acquire features of the multimedia resource based on a convolutional neural network, wherein the convolutional neural network comprises N convolutional layers, wherein N is a positive integer;
  determine user interest information based on an identifier of a recommended user, wherein the user interest information is corresponding to the feature of each convolutional layer;
  determine a first feature matrix based on the convolution of convolution kernel and the feature, wherein the convolution kernel comprises the user interest information;
  generate user preference data based on the first feature matrix; and
  recommend the multimedia resource to the recommended user based on the N generated user preference data;
  wherein the processor is further configured to read and execute the executable instructions to:
  determine user attention information based on the identifier, wherein the user attention information matches with the features;
  generate a user attention weight based on the user attention information and the feature; and
  generate the user preference data based on the first feature matrix and the user attention weight.

10. The apparatus according to claim 9, wherein the processor is further configured to read and execute the executable instructions to:
  determine a second feature matrix based on the convolution of the convolution kernel and the feature, wherein the convolution kernel comprises the user attention information; and
  obtain the user attention weight by normalizing the second feature matrix.

11. The apparatus according to claim 9, wherein the processor is further configured to read and execute the executable instructions to:
  reduce a dimension of the first feature matrix by a maximum pooling layer; and
  determine the user preference data by weighting and fusing the dimension-reduced first feature matrix and the user attention weight.

12. The apparatus according to claim 11, wherein the second feature matrix is normalized by a following formula:

$$w_{i,s,t}=\exp(v\_\{i,s,t\})/\Sigma_{s',t'}\exp(v\_\{i,s',t'\});$$

wherein $w_{i,s,t}$ refers to the user attention weight; and $v\_\{i, s, t\}$ and $v\_\{i, s', t'\}$ refer to two elements at different positions in the second feature matrix; and s' and t' are positive integers for traversing all elements in the second feature matrix.

13. The apparatus according to claim 9, wherein the processor is further configured to read and execute the executable instructions to:
acquire a target weight matrix, wherein the target weight matrix provides weights corresponding to the N generated user preference data;
weight and fuse the N generated user preference data based on the target weight matrix; and
recommend the multimedia resource to the recommended user based on the weighted and fused user preference data.

14. The apparatus according to claim 13, wherein the N generated user preference data are weighted and fused by a following formula:

$$o_i = \frac{r_{ij}^* o_{ij}}{\sum_j r_{ij}};$$

wherein $o_i$ refers to the fused user preference data; j ranges from 1 to N; $o_{ij}$ refers to the user preference data corresponding to a feature output from a jth convolutional layer; $r_{ij}$ refers to a weight corresponding to $o_{ij}$ in the target weight matrix; the target weight matrix is ($r_{i1}$, $r_{i2}$, $r_{i3}$, ..., $r_{iL}$); and i refers to the identifier of the recommended user.

15. The apparatus according to claim 9, wherein the processor is further configured to read and execute the executable instructions to:
determine the user interest information by vectorizing the identifier based on a first embedding layer; wherein the user interest information is a matrix with an m*m size, and m indicates a width of the convolution kernel used by the each convolutional layer.

16. The apparatus according to claim 9, wherein the processor is further configured to read and execute the executable instructions to:
determine the user attention information by vectorizing the identifier based on a second embedding layer;
wherein the user attention information is a matrix with an m*m size, and m indicates a width of the convolution kernel used by the each convolutional layer; and a second weight matrix of the second embedding layer is different from a first weight matrix of a first embedding layer.

17. A non-transitory computer readable storage medium, wherein instructions in the storage medium are executed by a processor of an electronic device to cause the electronic device to:
acquire features of the multimedia resource based on a convolutional neural network, wherein the convolutional neural network comprises N convolutional layers, wherein N is a positive integer;
determine user interest information based on an identifier of a recommended user, wherein the user interest information is corresponding to the feature of each convolutional layer;
determine a first feature matrix based on the convolution of convolution kernel and the feature, wherein the convolution kernel comprises the user interest information;
generate user preference data based on the first feature matrix;
recommend the multimedia resource to the recommended user based on the N generated user preference data;
determine user attention information based on the identifier, wherein the user attention information matches with the features;
generate a user attention weight based on the user attention information and the feature; and
generate the user preference data based on the first feature matrix and the user attention weight.

* * * * *